United States Patent
Saito

(10) Patent No.: US 10,072,821 B2
(45) Date of Patent: Sep. 11, 2018

(54) LIGHT FLUX CONTROLLING MEMBER AND LIGHT-EMITTING DEVICE

(71) Applicant: Enplas Corporation, Saitama (JP)

(72) Inventor: Tomohiro Saito, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 113 days.

(21) Appl. No.: 14/969,722

(22) Filed: Dec. 15, 2015

(65) Prior Publication Data
US 2016/0201879 A1    Jul. 14, 2016

(30) Foreign Application Priority Data
Jan. 9, 2015    (JP) ................. 2015-003506

(51) Int. Cl.
| | |
|---|---|
| *F21V 13/04* | (2006.01) |
| *F21V 5/04* | (2006.01) |
| *F21V 7/04* | (2006.01) |
| *F21V 7/00* | (2006.01) |
| *G02B 3/08* | (2006.01) |
| *F21Y 115/10* | (2016.01) |

(52) U.S. Cl.
CPC ............. *F21V 13/04* (2013.01); *F21V 5/045* (2013.01); *F21V 7/0091* (2013.01); *F21V 7/04* (2013.01); *G02B 3/08* (2013.01); *F21Y 2115/10* (2016.08)

(58) Field of Classification Search
CPC .......................................................... F21V 13/04
See application file for complete search history.

(56) References Cited

U.S. PATENT DOCUMENTS

| | | | | |
|---|---|---|---|---|
| 2012/0300466 A1* | 11/2012 | Asai | ................... | G02B 19/0009 362/297 |
| 2013/0051029 A1* | 2/2013 | Suzuki | ................... | F21V 5/045 362/297 |
| 2015/0062916 A1* | 3/2015 | Takayama | ............... | F21V 13/04 362/308 |
| 2015/0062917 A1* | 3/2015 | Yin | ........................ | F21V 13/04 362/309 |
| 2015/0085513 A1* | 3/2015 | Spinger | ............... | F21S 48/2243 362/522 |
| 2017/0082261 A1* | 3/2017 | Yamada | ................... | F21V 5/008 |

FOREIGN PATENT DOCUMENTS

JP         3147939 Y1    1/2009

* cited by examiner

*Primary Examiner* — Jong-Suk (James) Lee
*Assistant Examiner* — Christopher E Dunay
(74) *Attorney, Agent, or Firm* — Brundidge & Stanger, P.C.

(57) ABSTRACT

A light flux controlling member includes an incidence region and an emission region. The incidence region includes a refraction part on which a part of the light emitted from the light emitting element is incident, the refraction part being disposed at a center portion of the incidence region and configured to refract the incident light such that the incident light travels away from an optical axis of the light emitting element, and a reflection part on which another part of the light emitted from the light emitting element is incident, the reflection part being disposed outside the refraction part and configured to reflect the incident light such that the incident light approaches the optical axis. The emission region has an area smaller than a projection area of the light flux controlling member and emits light reflected by the reflection part such that the light approaches the optical axis.

4 Claims, 14 Drawing Sheets

LIGHT FLUX CONTROLLING MEMBER AND LIGHT-EMITTING DEVICE

CROSS REFERENCE TO RELATED APPLICATIONS

This application is entitled to and claims the benefit of Japanese Patent Application No. 2015-003506, filed on Jan. 9, 2015, the disclosure of which including the specification, drawings and abstract is incorporated herein by reference in its entirety.

TECHNICAL FIELD

The present invention relates to a light flux controlling member that controls distribution of light emitted from a light emitting element. In addition, the present invention relates to a light-emitting device having the light flux controlling member.

BACKGROUND ART

In recent years, for the purpose of energy saving and downsizing, light-emitting devices (LED flash) using a light-emitting diode (hereinafter referred to as "LED") as the light source have been increasingly used as a light-emitting device for an image pickup camera.

However, an LED is a point light source and has directivity, and therefore, in a planar illuminated region, the illumination amount at a portion remote from the optical axis of the LED is smaller than that of a portion close to the optical axis of the LED. As a result, the illumination amount is non-uniform in the illuminated region.

Under such circumstances, a lens for uniformly illuminating an illumination region with light emitted from an LED has been proposed (see, for example, PTL 1).

The lens disclosed in PTL 1 includes a light source side optical surface, and an image side optical surface formed on a side opposite to the light source side optical surface. The light source side optical surface is a recessed surface having an aspherical shape or a spherical shape, and the image side optical surface is a fresnel optical surface composed of a plurality of annular protrusions. Each protrusion includes a vertical annular surface and a tilted surface. In the lens disclosed in PTL 1, the light beam emitted from a light source is spread at the light source side optical surface and enters the lens. Next, the light beam thus entered the lens is refracted by the tilted surface serving as a condensing curved surface of the image side optical surface, and emitted to the outside. By condensing the light at the image side optical surface after spreading the light at the light source side optical surface, the illuminance at a center region of the illumination region can be prevented from being excessively increased, and the illumination region can be uniformly illuminated with the light.

CITATION LIST

Patent Literature

PTL 1: Japanese Registered Utility Model No. 3147939

SUMMARY OF INVENTION

Technical Problem

However, in the lens (light flux controlling member) disclosed in PTL 1, the light source side optical surface (incidence region) is a recessed surface having an aspherical shape or a spherical shape, and therefore the light emitted from a light source (light emitting element) may be spread to a size greater than that of the image side optical surface (emission region), thus making it impossible to control the light distribution. In addition, in the case where an illumination region having a predetermined area is illuminated with light and the emission region is limited to a small area, the amount of the light at the outer periphery portion of the illumination region may be insufficient. Further, since the fresnel optical surface is formed in the emission region and exposed to the outside, the fresnel optical surface may make contact with other components and thus may be damaged. If the fresnel optical surface is damaged, the light distribution cannot be appropriately controlled.

An object of the present invention is to provide a light flux controlling member which can appropriately control the distribution of light emitted from a light emitting element even when the emission region is limited to a smaller area, and can emit light while making up the insufficient light amount at an outer periphery portion of the illumination region. Another object of the present invention is to provide a light-emitting device having the light flux controlling member.

Solution to Problem

To achieve the above-mentioned object, a light flux controlling member of embodiments of the present invention that is configured to control distribution of light emitted from a light emitting element includes: an incidence region on which the light emitted from the light emitting element is incident; and an emission region formed on a side opposite to the incidence region and configured to emit the light incident on the incidence region, the emission region having an area smaller than a projection area of the light flux controlling member, wherein: the incidence region includes a refraction part on which a part of the light emitted from the light emitting element is incident, the refraction part being disposed at a center portion of the incidence region and configured to refract the incident light such that the incident light travels away from an optical axis of the light emitting element as the incident light propagates in the light flux controlling member, and a reflection part on which another part of the light emitted from the light emitting element is incident, the reflection part being disposed outside the refraction part and configured to reflect the incident light such that the incident light approaches the optical axis as the incident light propagates in the light flux controlling member; wherein the reflection part includes at least one protrusion having an annular shape and disposed to enclose the optical axis, wherein the protrusion includes: an incidence surface on which another part of the light emitted from the light emitting element is incident, and a reflecting surface disposed outside the incidence surface and configured to reflect light incident on the incidence surface in a direction approaching the optical axis; and the emission region emits light reflected by the reflection part such that the light approaches the optical axis as the light travels away from the emission region.

To achieve the above-mentioned object, a light-emitting device of embodiments of the present invention includes a light emitting element, and the light flux controlling member according to embodiments of the present invention disposed such that a central axis of the light flux controlling member coincides with the optical axis.

Advantageous Effects of Invention

According to the present invention, it is possible to provide a light-emitting device which can illuminate a illumination region with light more uniformly in comparison with a light-emitting device having a conventional light flux controlling member.

DESCRIPTION OF EMBODIMENTS

In the following, embodiments of the present invention are described in detail with reference to the accompanying drawings.

[Embodiment 1]
(Configurations of Light Flux Controlling Member and Light-emitting Device)

Figure 1:
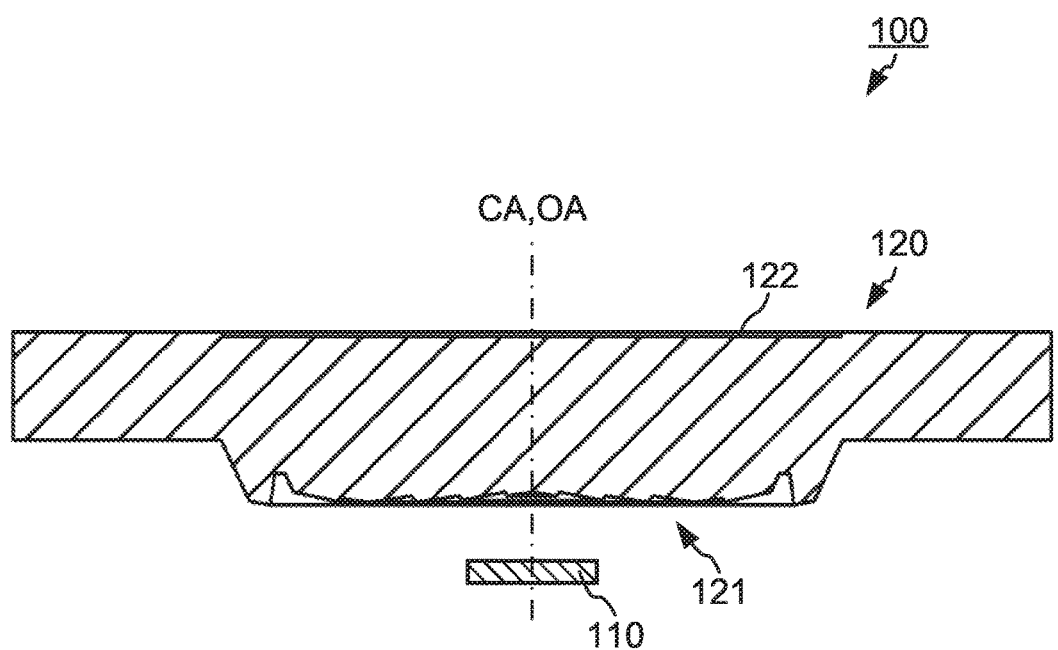
FIG. 1 is a sectional view of a light-emitting device according to Embodiment 1.

FIG. 1 is a sectional view of light-emitting device 100 according to Embodiment 1 of the present invention. As illustrated in FIG. 1, light-emitting device 100 includes light emitting element 110 and light flux controlling member 120.

Light emitting element 110 is a light source of light-emitting device 100, and is mounted on a substrate not illustrated. Light emitting element 110 is a light-emitting diode (LED) such as a white light-emitting diode, for example.

Light flux controlling member 120 controls the distribution of the light emitted from light emitting element 110. Light flux controlling member 120 is disposed in such a manner that its central axis CA coincides with optical axis OA of light emitting element 110. It is to be noted that the shapes of light flux incidence region 121 and emission region 122 of controlling member 120 described later are each rotationally symmetric, and the rotational axes of light flux incidence region 121 and emission region 122 are coincides with each other. The rotational axes of incidence region 121 and emission region 122 are referred to as "central axis CA of light flux controlling member." In addition, "optical axis OA of the light emitting element" refers to the light beam at the center of the light flux that is three-dimensionally emitted from light emitting element 110.

Figure 2:
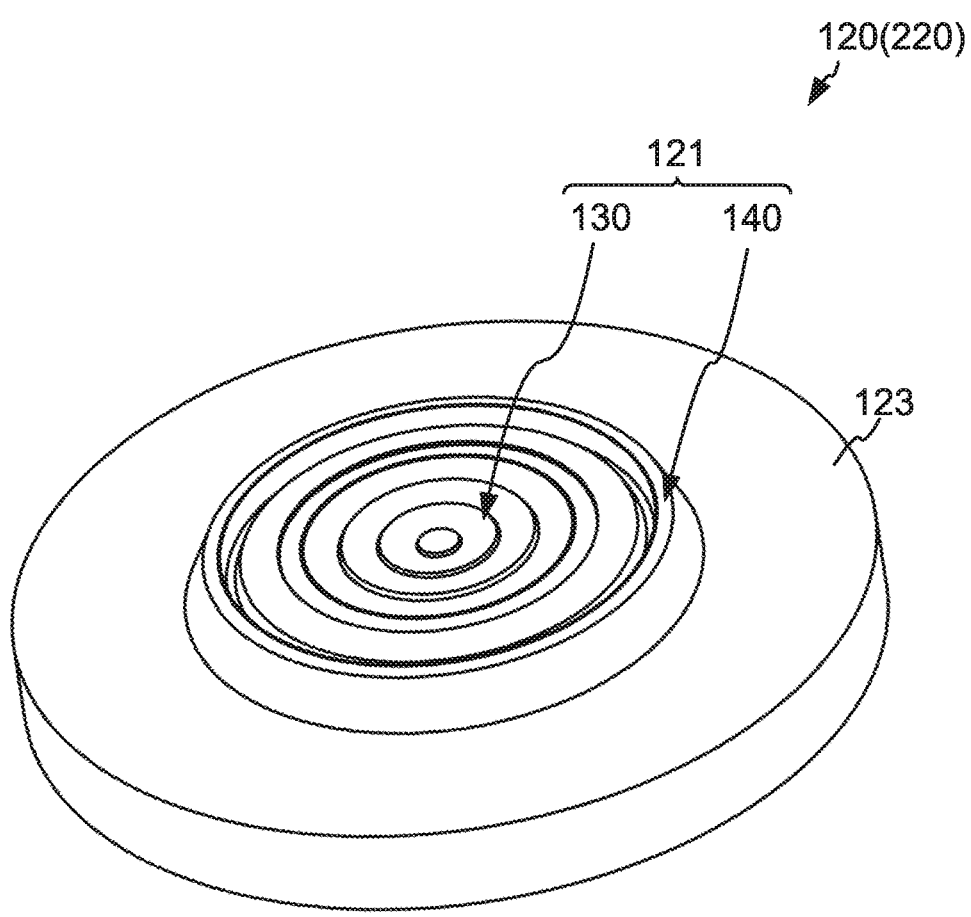
FIG. 2 is a perspective view of light flux controlling members according to Embodiments 1 and 2.
Figure 3A:
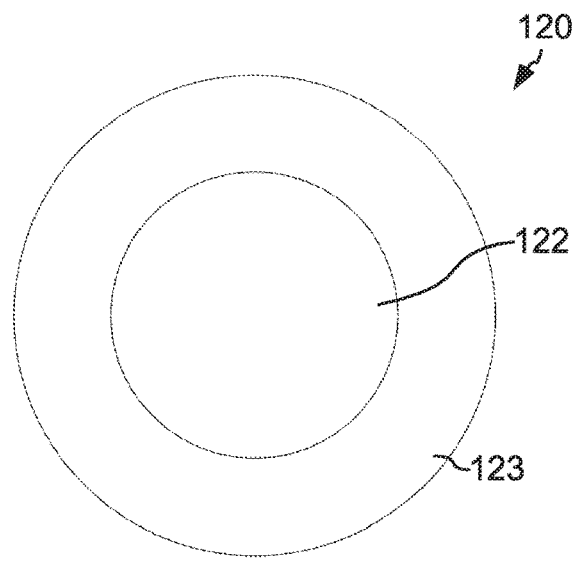
FIG. 3A to 3C illustrate a configuration of the light flux controlling member according to Embodiment 1.
Figure 3B:
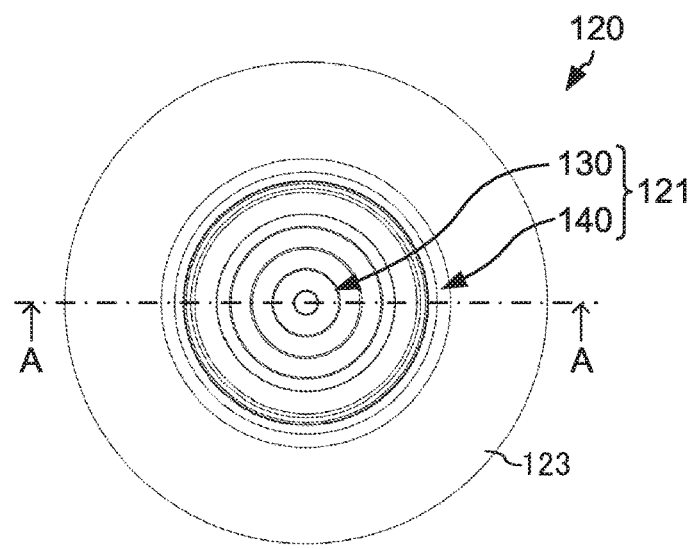
Figure 3C:
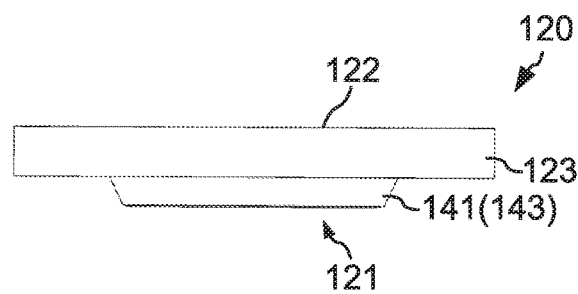
Figure 4A:
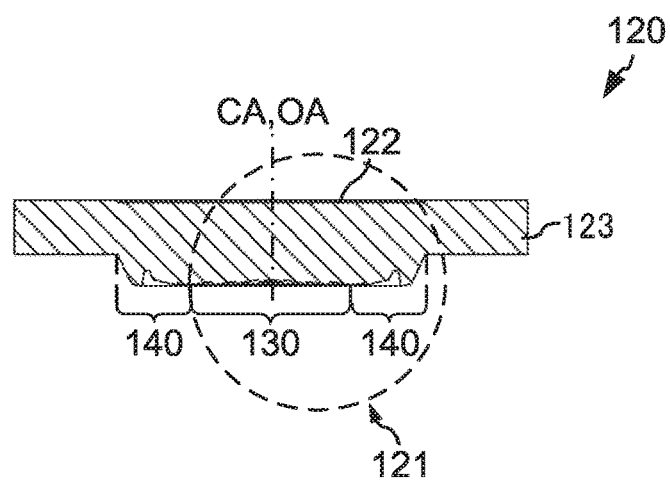
FIGS. 4A and 4B are sectional views illustrating a configuration of the light flux controlling member according to Embodiment 1.
Figure 4B:
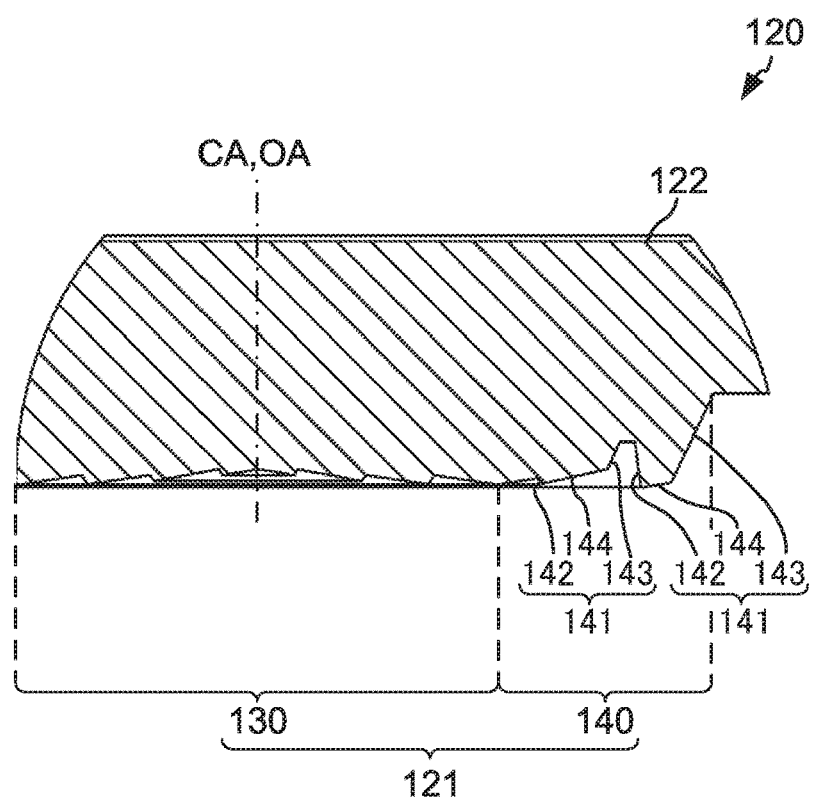

FIG. 2 to FIG. 4B illustrate a configuration of light flux controlling member 120 according to Embodiment 1. FIG. 2 is a perspective view. FIG. 3A is a plan view, FIG. 3B is a bottom view, and FIG. 3C is a side view. FIG. 4A is a sectional view taken along line A-A of FIG. 3B, and FIG. 4B is a partially enlarged sectional view of a region denoted with the broken line in FIG. 4A.

As illustrated in FIG. 2 to FIG. 4B, light flux controlling member 120 includes incidence region 121 on which light emitted from light emitting element 110 is incident, and emission region 122 provided on the side opposite to incidence region 121 and configured to output the light incident on incidence region 121. Flange 123 may or may not be provided between incidence region 121 and emission region 122. In the present embodiment, flange 123 is provided between incidence region 121 and emission region 122.

The shape of light flux controlling member 120 in plan view is not limited. As illustrated in FIG. 3A, light flux controlling member 120 according to the present embodiment has a circular shape in plan view. In addition, light flux controlling member 120 according to the present embodiment has a diameter of about 4.7 mm, for example.

The material of light flux controlling member 120 is not specifically limited as long as the light having desired wavelengths can pass through light flux controlling member 120. Examples of the material of light flux controlling member 120 include light transmissive resins such as polymethylmethacrylate (PMMA), polycarbonate (PC), and epoxy resin (EP), and glass. Light flux controlling member 120 can be manufactured by injection molding, for example.

Light emitted from light-emitting elements 110 is incident on incidence region 121. As illustrated in FIG. 4A, incidence region 121 includes refraction part 130 provided at a center portion of incidence region 121 and reflection part 140 disposed outside refraction part 130. As described above, the shape of incidence region 121 is rotationally symmetrical about its rotational axis. The rotational axis coincides with central axis CA of light flux controlling member 120 and optical axis OA of light emitting element 110. Incidence region 121 has a circular external shape.

Refraction part 130 allows a part of light emitted from light emitting element 110 (light emitted at a relatively small angle with respect to optical axis OA) to enter light flux controlling member 120, and refracts the light such that the light having entered light flux controlling member 120 travels away from optical axis OA of light emitting element 110 as the light propagates in light flux controlling member 120 (see FIGS. 5A and 5B described later). As long as refraction part 130 can have such a function, the shape of refraction part 130 is not limited. Examples of the shape of refraction part 130 include a fresnel lens shape, a spherical shape, and an aspherical shape. In the present embodiment, refraction part 130 has a fresnel lens shape.

Reflection part 140 allows another part of the light emitted from light emitting element 110 (light emitted at a relatively large angle with respect to optical axis OA) to incident on reflection part 140, and reflects most of the incident light such that the light approaches optical axis OA as the light propagates in light flux controlling member 120. Part of the light incident on reflection part 140 may not be reflected (see FIG. 5B described later). Reflection part 140 has annular protrusion 141 disposed in such a manner as to enclose optical axis OA. The number of protrusion 141 is not limited, and for example, one or more protrusions 141 may be provided. In addition, the shape and the size of protrusion 141 are not limited as long as the above-mentioned function can be ensured. When a plurality of protrusions 141 are provided, the shape and the size of protrusions 141 may be identical to each other or different from each other. In the present embodiment, two protrusions 141 are provided, and protrusions 141 have different shapes.

As illustrated in FIG. 4B, protrusion 141 includes incidence surface 142, reflecting surface 143 and connection surface 144. In protrusion 141, incidence surface 142 is disposed on the inner side (central axis CA side), reflecting surface 143 is disposed on the outer side, and connection surface 144 is disposed in such a manner as to connect incidence surface 142 and reflecting surface 143.

Incidence surface 142 is a curved surface that allows another part of the light emitted from light emitting element 110 (light emitted at a relatively large angle with respect to optical axis OA) to enter protrusion 141. Incidence surface 142 may be parallel to central axis CA (optical axis OA), or may be tilted with respect to central axis CA. In the present embodiment, for the purpose of facilitating the releasing at the time of injection molding, incidence surface 142 is tilted such that the distance from central axis CA increases toward the lower end (reference surface) of light flux controlling member 120. Here the "the lower end of light flux controlling member" refers to the vertex of protrusion 141 (outer protrusion 141 in the present embodiment), and the "reference surface" refers to a plane including the vertex of protrusion 141. Preferably, the inclination angle of incidence surface 142 is greater than 0 degree, and equal to or smaller than 10 degrees with respect to central axis CA in any cross-section including central axis CA. The inclination angle of incidence surface 142 is preferably equal to or smaller than 5 degrees.

Reflecting surface 143 is a curved surface which is formed in such a manner as to face incidence surface 142, and is configured to reflect the light incident on incidence surface 142 toward emission region 122 in a direction approaching optical axis OA. In addition, for the purpose of totally reflecting the light that has reached reflecting surface 143, reflecting surface 143 is tilted with respect to central axis CA. Reflecting surface 143 is tilted such that the distance to central axis CA decreases toward the lower end (reference surface) of protrusion 141. For example, reflecting surface 143 is tilted by 22 to 30 degrees with respect to central axis CA (optical axis OA).

Connection surface 144 connects incidence surface 142 and reflecting surface 143. In the present embodiment, connection surface 144 allows the light emitted from light emitting element 110 and reaching connection surface 144 to enter protrusion 141, and refracts the light having entered light protrusion 141 such that the light travels away from optical axis OA of light emitting element 110 as the light propagates in light flux controlling member 120. Connection surface 144 may be a planar surface or a curved surface. In the present embodiment, connection surface 144 is a curved surface. In addition, it is also possible to directly connect incidence surface 142 and reflecting surface 143 without forming connection surface 144.

Emission region 122 is formed on the side opposite to incidence region 121, and configured to emit the light incident on incidence region 121. Emission region 122 is a planar surface or a curved surface which is formed on the side nearer to the region to be illuminated, which is opposite to light emitting element 110 side. In the present embodiment, emission region 122 is a planar surface. In addition, the area of emission region 122 is smaller than the projection area of light flux controlling member 120 from incidence region 121 side or emission region 122 side in a direction along central axis CA of light flux controlling member 120. As illustrated in FIG. 4A and FIG. 4B, emission region 122 is formed in such a manner as to intersect with central axis CA of light flux controlling member 120. Emission region 122 emits the light reflected at reflection part 140 such that the light approaches optical axis OA as the light travels away from emission region 122. After most closely approaching optical axis OA, this light travels away from optical axis OA as the light travels away from emission region 122. In addition, emission region 122 emits the light refracted at refraction part 130 and the light refracted at connection surface 144 of reflection part 140, and the direction in which the light is emitted is not limited. In the present embodiment, emission region 122 emits the light refracted at refraction part 130 and the light refracted at connection surface 144 of reflection part 140 such that the light travels away from optical axis OA as the light travels away from emission region 122.

(Light Distribution Characteristics of Light Flux Controlling Member)

Now, the light distribution characteristics of light flux controlling member 120 according to Embodiment 1 are described. FIGS. 5A and 5B illustrate light paths in light-emitting device 100 according to Embodiment 1. FIG. 5A illustrates light paths of light having entered light flux controlling member 120 through refraction part 130, and FIG. 5B illustrates light paths of light having entered light flux controlling member 120 through an outer region of refraction part 130 and reflection part 140.

Figure 5A:
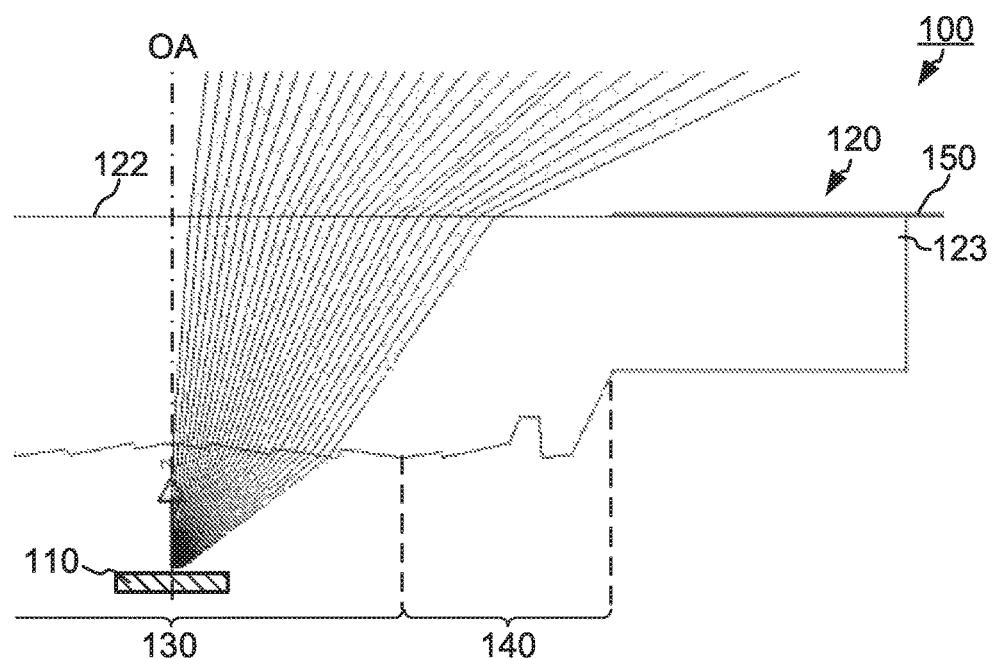
FIGS. 5A and 5B illustrate light paths in the light-emitting device according to Embodiment 1.
Figure 5B:
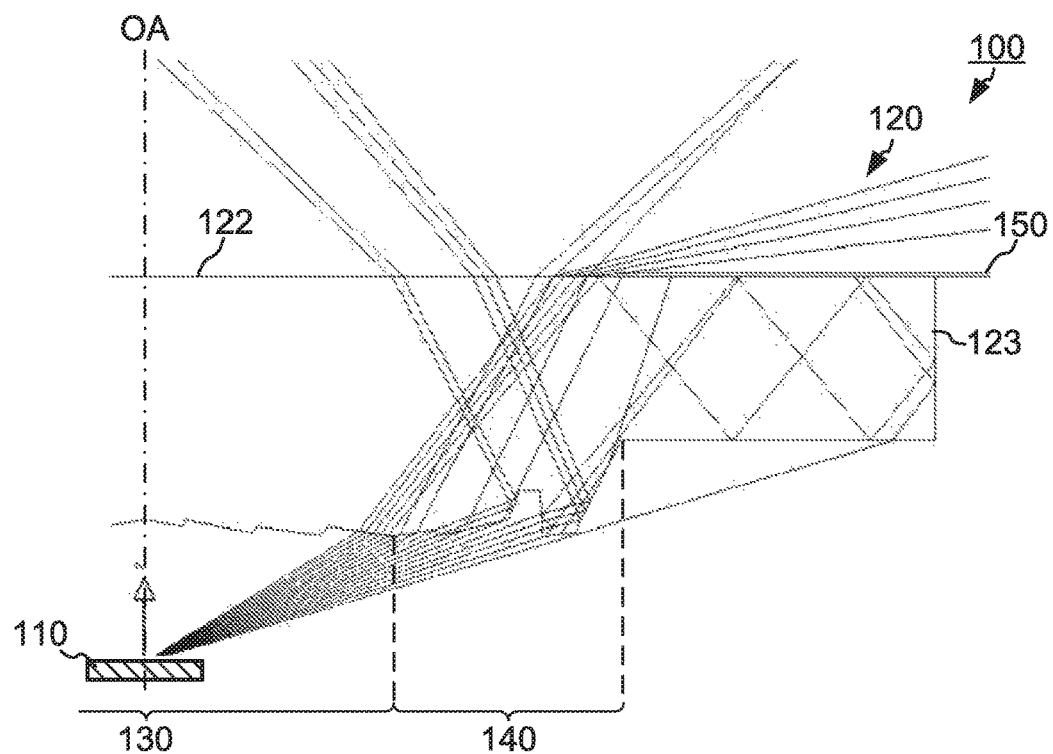

As illustrated in FIG. 5A and FIG. 5B, part of light emitted from light emitting element 110 (light emitted at a relatively small angle with respect to optical axis OA) enters light flux controlling member 120 through refraction part 130. At this time, the incident light is refracted such that the incident light travels away from optical axis OA of light emitting element 110 as the light propagates in light flux controlling member 120, and, the incident light is emitted from emission region 122 such that the light travels away from optical axis OA of light emitting element 110 as the light travels away from emission region 122.

In addition, as illustrated in FIG. 5B, another part of the light emitted from light emitting element 110 (light emitted at a relatively large angle with respect to optical axis OA) enters light flux controlling member 120 through incidence surface 142 and connection surface 144 of reflection part 140. The light having entered light flux controlling member 120 through incidence surface 142 is reflected at reflecting surface 143 in the direction approaching optical axis OA of light emitting element 110, and is emitted from emission region 122 such that the light approaches optical axis OA of light emitting element 110. On the other hand, the light having entered light flux controlling member 120 through connection surface 144 is emitted from emission region 122 such that the light travels away from optical axis OA of light emitting element 110 as the light travels away from emission region 122. It is to be noted that, in FIGS. 5A and 5B, light shielding plate 150 is disposed on the top surface of flange 123 (the surface located on the outer side of emission region 122), and therefore the light emitted from flange 123 is not effectively utilized as illumination light.

(Simulation)

Simulation of the luminous intensity distribution was carried out in light-emitting device 100 having light flux controlling member 120 according to the embodiment. For comparison, simulations were also carried out in a light-emitting device whose reflection part 140 in incidence region 121 is shadowed, and a light-emitting device whose refraction part 130 in incidence region 121 is shadowed. In this case, light shielding plate 150 provided with a through hole (window) is disposed on the top surface of flange 123 (the surface located on the outer side of emission region 122) (see FIGS. 5A and 5B). The part on the inner side of the through hole of the top surface of light flux controlling member 120 serves as emission region 122. Further, for comparison, simulations of the luminous intensity distribution were carried out in a light-emitting device which has no light flux controlling member 120 and light shielding plate 150 but has only light emitting element 110 (hereinafter referred to as "light-emitting device according to comparative example 1"), and a light-emitting device in which only light shielding plate 150 is disposed over light emitting element 110 (hereinafter referred to as "light-emitting device according to comparative example 2"). In this case, in the light-emitting device according to comparative example 2, the through hole (window) of light shielding plate 150 is disposed at a position corresponding to emission region 122 of light flux controlling member 120 according to the present embodiment.

Figure 6:
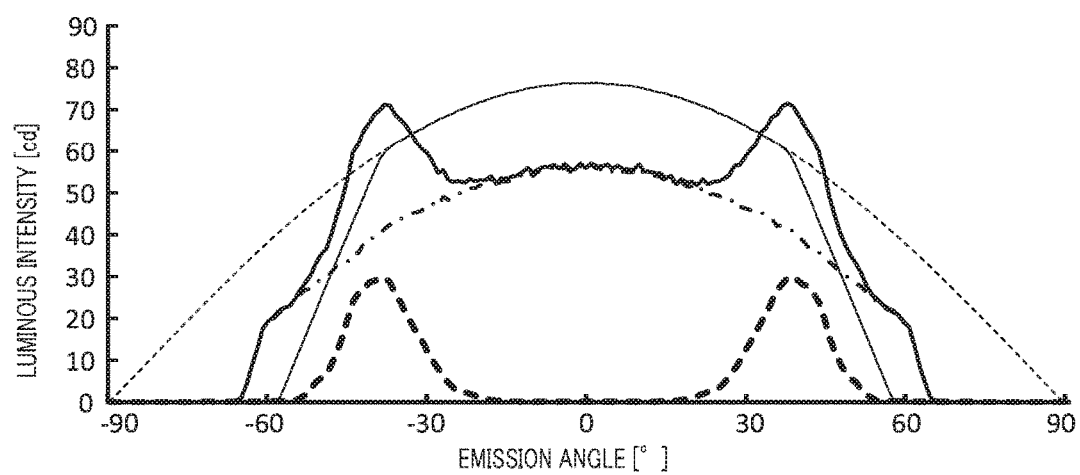
FIG. 6 shows results of simulation of the luminous intensity distribution in the light-emitting device according to Embodiment 1 and light-emitting devices for comparison.

FIG. 6 shows results of simulations of the luminous intensity distribution in light-emitting device 100 according to the present embodiment and the light-emitting devices for comparison. In FIG. 6, the abscissa indicates emission angle (°) of the light emitted from emission region 122 of the light-emitting device with respect to optical axis OA of light emitting element 110 (0 degree), and the ordinate indicates the luminous intensity (cd) of the light emitted from the light-emitting device. In addition, in FIG. 6, the result of the simulation in light-emitting device 100 according to the present embodiment is indicated with thick solid line, the result of the simulation in the light-emitting device whose reflection part 140 is shadowed is indicated with dashed line, the result of the simulation in the light-emitting device whose refraction part 130 is shadowed is indicated with thick broken line, the result of the simulation in the light-emitting device having only light emitting element 110 (the light-emitting device according to comparative example 1) is indicated with thin broken line, and the result of the simulation in the light-emitting device having only light emitting element 110 and light shielding plate 150 (the light-emitting device according to comparative example 2) is indicated with thin solid line.

As indicated with the thin broken line in FIG. 6, it was confirmed that the light-emitting device having only light emitting element 110 (the light-emitting device according to comparative example 1) emits the light in the direction of −90 degrees to +90 degrees. Here, in the case where light is applied to an illumination surface having a planar shape, light having a small emission angle and light having a large emission angle are different from each other in the distance to the illumination surface and the incident angle to the illumination surface. For this reason, even when the light having a small emission angle and light having a large emission angle have the same luminous intensity, the illuminance is small in a part at which the light having a large emission angle arrives in the illumination surface. As illustrated in FIG. 6, in the case of the light-emitting device according to comparative example 1, the luminous intensity was greatest in the direction of 0 degree (the direction of optical axis OA), and the greater the emission angle, the smaller the luminous intensity. It was confirmed from the above points that, in the light-emitting device according to comparative example 1, the amount of light is insufficient at the outer periphery portion of the region to be illuminated.

In addition, as indicated with the thin solid line in FIG. 6, it was confirmed that in the light-emitting device having only light emitting element 110 and light shielding plate 150 (the light-emitting device according to comparative example 2), the light is emitted in the direction of −60 degrees to +60 degrees, and the luminous intensity abruptly decreases in the range falling outside the range of −45 degrees to +45 degrees. This results show that, in the present embodiment, light shielding plate 150 controls the light in such a manner as to shadow the light emitted from light emitting element 110 in the directions outside the range of −45 degrees to +45 degrees, and to illuminate the illumination surface in a spot-like manner with the light that falls within the range of −45 degrees to +45 degrees.

In addition, as indicated with the dashed line in FIG. 6, it was confirmed that, in the light-emitting device whose reflection part 140 is shadowed, the luminous intensity within the range of −45 degrees to +45 degrees is small. To be more specific, it was confirmed that, in comparison with the light-emitting device having no light flux controlling member 120 (the light-emitting device according to comparative example 1 and comparative example 2), the luminous intensity in the direction of 0 degree (the direction of optical axis OA) is reduced, and thus generation of a bright spot at the center of the illumination surface can be reduced. Given the above, it was confirmed that refraction part 130 contributes to spread the incident light by refracting the incident light in the direction away from optical axis OA.

Further, as indicated with the thick broken line in FIG. 6, it was confirmed that, the light-emitting device whose refraction part 130 is shadowed emits light in the direction of −60 degrees to −30 degrees and +30 degrees to +60 degrees, with the peaks in the direction for illuminating the outer periphery portion of the illumination surface (emission angle: ±45 degrees). As described above, reflection part 140 reflects at reflecting surface 143 part of light emitted at a large emission angle in a direction approaching optical axis OA of light emitting element 110 (see FIG. 5B). With this configuration, reflection part 140 can collect the light emitted from light emitting element 110 at a large emission angle to the optical axis OA of light emitting element 110 side (in the present embodiment, in the direction of −60 degrees to −30 degrees and +30 degrees to +60 degrees, and in particular, the direction of ±45 degrees for illuminating the outer periphery portion of the illumination surface). That is, it was confirmed that reflection part 140 can appropriately control the light which is shadowed by light shielding plate 150 in the light-emitting device according to comparative example 2, so as to emit the light from the window (emission region 122) of light shielding plate 150, thus contributing to make up the insufficient light amount at the outer periphery portion of the illumination surface.

Consequently, as indicated with the thick solid line in FIG. 6, light-emitting device 100 according to the present embodiment can emit light having a luminous intensity distribution suitable for illumination light for a planar illumination surface in the direction of −45 degrees to +45 degrees. In addition, as described above, the distance to the illumination surface is long in the case of light having a large emission angle in comparison with light having a small emission angle. For this reason, in view of uniformly illuminating a planar illumination surface, the light having a large emission angle preferably has a relatively high luminous intensity in comparison with the light having a small emission angle (see the simulation of Embodiment 2). In comparison with the light-emitting devices according to comparative example 1 and comparative example 2, light-emitting device 100 according to the present embodiment can reduce the luminous intensity of the emission light having a small emission angle (−30 degrees to +30 degrees), and can increase the luminous intensity of the emission light having a large emission angle (−65 degrees to −30 degrees, +30 degrees to +65 degrees, and in particular, ±45 degrees corresponding to the outer periphery portion of the illumination surface). Given the above, light-emitting device 100 according to the present embodiment can make up the insufficient light amount at the outer periphery portion of the region to be illuminated.

(Effect)

As described above, since light flux controlling member 120 according to the present embodiment includes reflection part 140 configured to guide light to emission region 122 which is limited to a small area in incidence region 121, the distribution of light emitted from light emitting element 110 can be appropriately controlled. In addition, since refraction part 130 configured to spread the light in the proximity of optical axis OA is provided in incidence region 121, it is possible to prevent a bright spot from being generated at the center of the illumination surface. Therefore, light-emitting device 100 according to the present embodiment can uniformly illuminate the region to be illuminated with light. In addition, as described above, in light-emitting device 100 according to the present embodiment, the light emitted from light emitting element 110 at a large emission angle can be appropriately controlled with reflection part 140, and thus the use efficiency of light can be increased. Further, in light flux controlling member 120 according to the present embodiment, refraction part 130 having a fresnel lens shape is formed on light emitting element 110 side and is not exposed to the outside, and thus the loss of the light distribution characteristics due to the damage or the like is prevented.

[Embodiment 2]

Light flux controlling member 220 and light-emitting device 200 according to Embodiment 2 are respectively different from light flux controlling member 120 and light-emitting device 100 according to Embodiment 1 only in the shape of light flux controlling member 220. Therefore, the same components as those of light flux controlling member 120 and light-emitting device 100 according to Embodiment 1 are denoted by the same reference numerals, and the descriptions thereof are omitted. It is to be noted that, in the present embodiment, second reflection part 224 are additionally provided, and therefore reflection part 140 is referred to as first reflection part 140.

(Configuration of Light Flux Controlling Member)

Figure 7A:
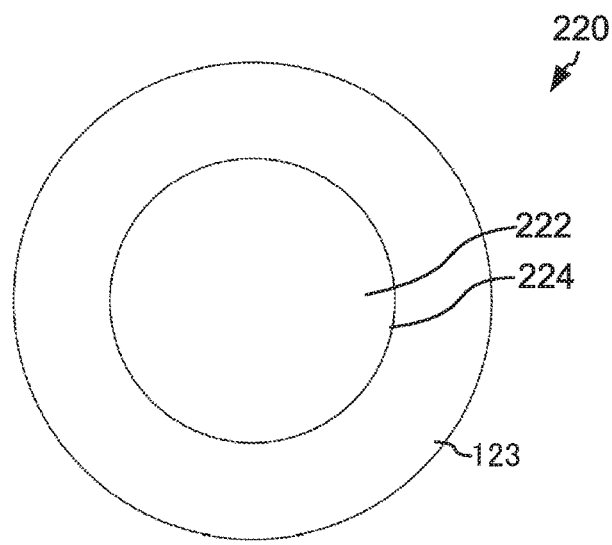
FIGS. 7A to 7C illustrate a configuration of the light flux controlling member according to Embodiment 2.
Figure 7B:
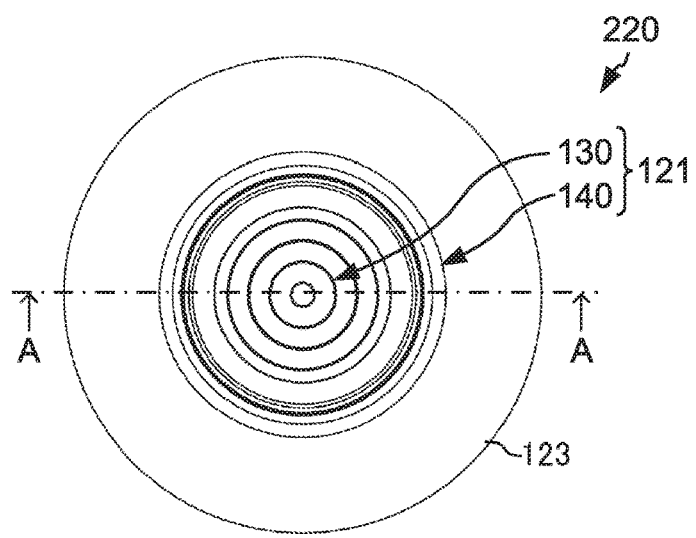
Figure 7C:
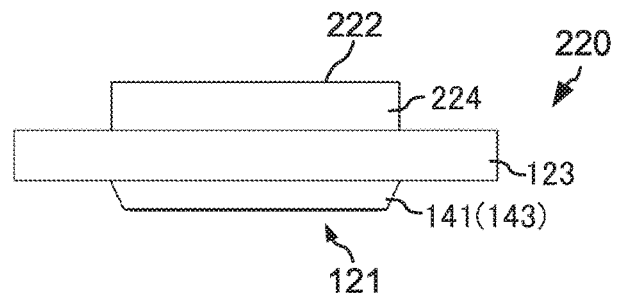
Figure 8A:
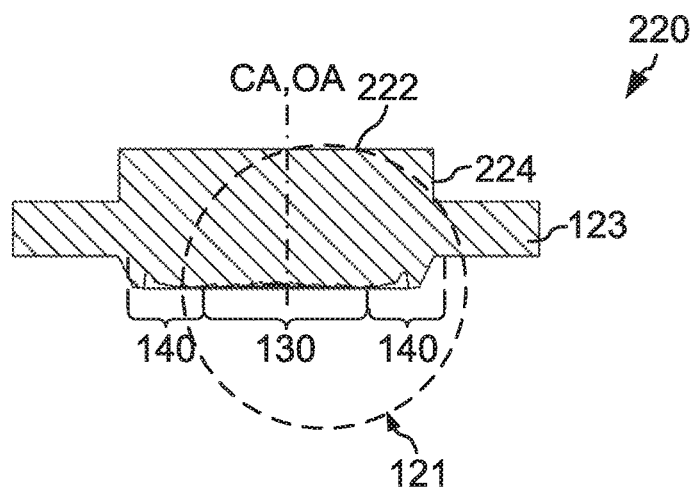
FIGS. 8A and 8B are sectional views illustrating a configuration of the light flux controlling member according to Embodiment 2.
Figure 8B:
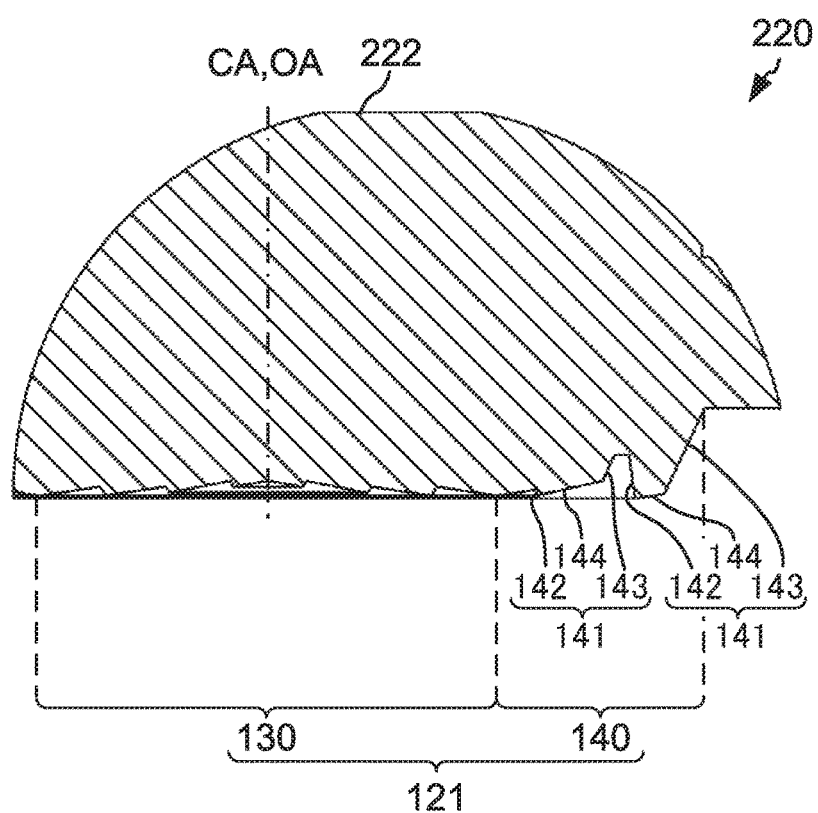

FIG. 2 and FIG. 7A to FIG. 8B illustrate a configuration of light flux controlling member 220 according to Embodiment 2. FIG. 2 is a perspective view. FIG. 7A is a plan view, FIG. 7B is a bottom view, and FIG. 7C is a side view. FIG. 8A is a sectional view taken along line A-A of FIG. 7B, and FIG. 8B is a partially enlarged sectional view of the region indicated with the broken line in FIG. 8A.

As illustrated in FIG. 2 and FIG. 7A to FIG. 8B, light flux controlling member 220 according to the present embodiment includes incidence region 121, emission region 222, flange 123 and second reflection part 224. In the present embodiment, a protrusion having a circular shape in plan view is formed at an upper part of light flux controlling member 220. The top surface of the protrusion functions as emission region 222, and the side surface of the protrusion function as second reflection part 224. Second reflection part 224 is disposed in such a manner as to enclose optical axis OA between incidence region 121 and emission region 222. The protrusion is fit into the opening part of light shielding plate 150 described later to thereby define emission region 222. That is, a configuration in which the top surface of flange 123 does not function as emission region 222 is obtained.

The shape in plan view of light flux controlling member 220 is not limited. As illustrated in FIG. 7A, light flux controlling member 220 according to the present embodiment has a circular shape in plan view. In addition, light flux controlling member 220 according to the present embodiment has a diameter of about 4.7 mm for example. The material of light flux controlling member 220 is identical to light flux controlling member 120 according to Embodiment 1, and therefore the description thereof is omitted.

As illustrated in FIG. 7C, second reflection part 224 is a side surface of the protrusion formed at an upper part of light flux controlling member 220. Second reflection part 224 reflects part of the light having entered light flux controlling member 220 toward emission region 222 in a direction in which the light approaches optical axis OA as the light propagates in light flux controlling member 220. In the present embodiment, second reflection part 224 reflects the light incident on a peripheral portion of refraction part 130 toward emission region 222 in a direction in which the light approaches optical axis OA as the light propagates in light flux controlling member 220. Second reflection part 224 is a curved surface disposed between incidence region 121 and emission region 222 in such a manner as to enclose optical axis OA. In addition, second reflection part 224 may be parallel to central axis CA (optical axis OA) or may be tilted with respect to central axis CA. In the present embodiment, second reflection part 224 is parallel to central axis CA.

As illustrated in FIG. 7C, emission region 222 is the top surface of the protrusion formed at an upper part of light flux controlling member 220. Emission region 222 is a planar surface or a curved surface formed on the side opposite to incidence region 121, and configured to emit light incident on incidence region 121. In the present embodiment, emission region 222 is a planar surface. In addition, the area of emission region 222 is smaller than the projection area of light flux controlling member 220. As illustrated in FIG. 8A, emission region 222 is formed in such a manner as to intersect with central axis CA of light flux controlling member 220. Emission region 222 emits the light reflected at first reflection part 140 or second reflection part 224 such that the light approaches optical axis OA as the light travels away from emission region 222. After most closely approaching optical axis OA, this light travels away from optical axis OA as the light travels away from emission region 222. In addition, emission region 222 emits part of the light refracted at refraction part 130, and the direction in which the part of the light is emitted is not limited. In the present embodiment, emission region 222 emits part of the light refracted at refraction part 130 such that the light travels away from optical axis OA as the light travels away from emission region 222.

(Light Distribution Characteristics of Light Flux Controlling Member)

Figure 9A:
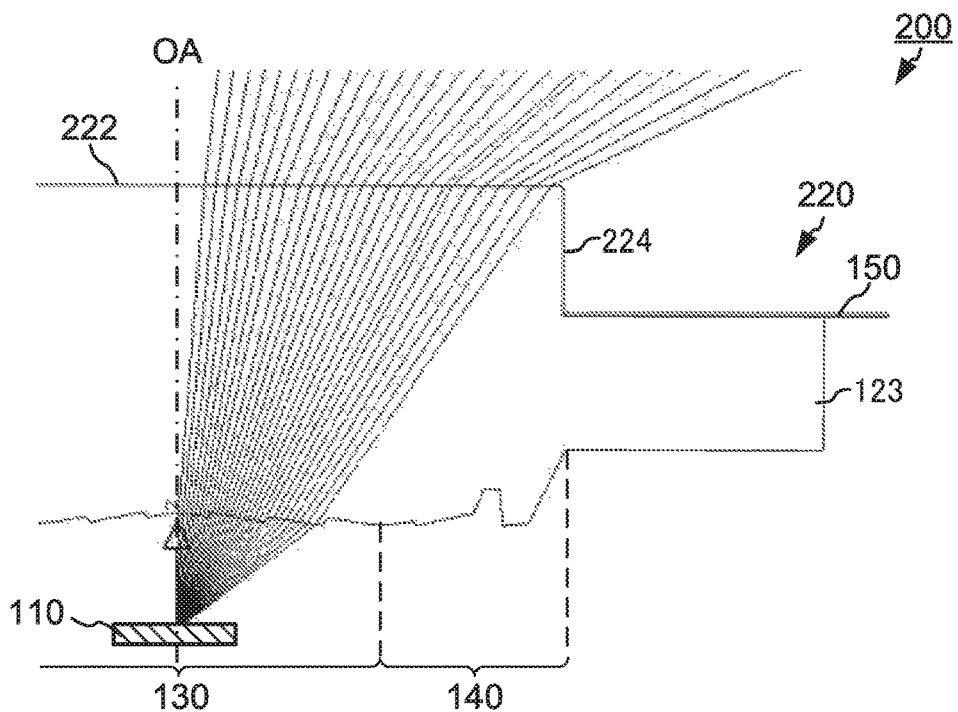
FIGS. 9A and 9B illustrate light paths in the light-emitting device according to Embodiment 2.
Figure 9B:
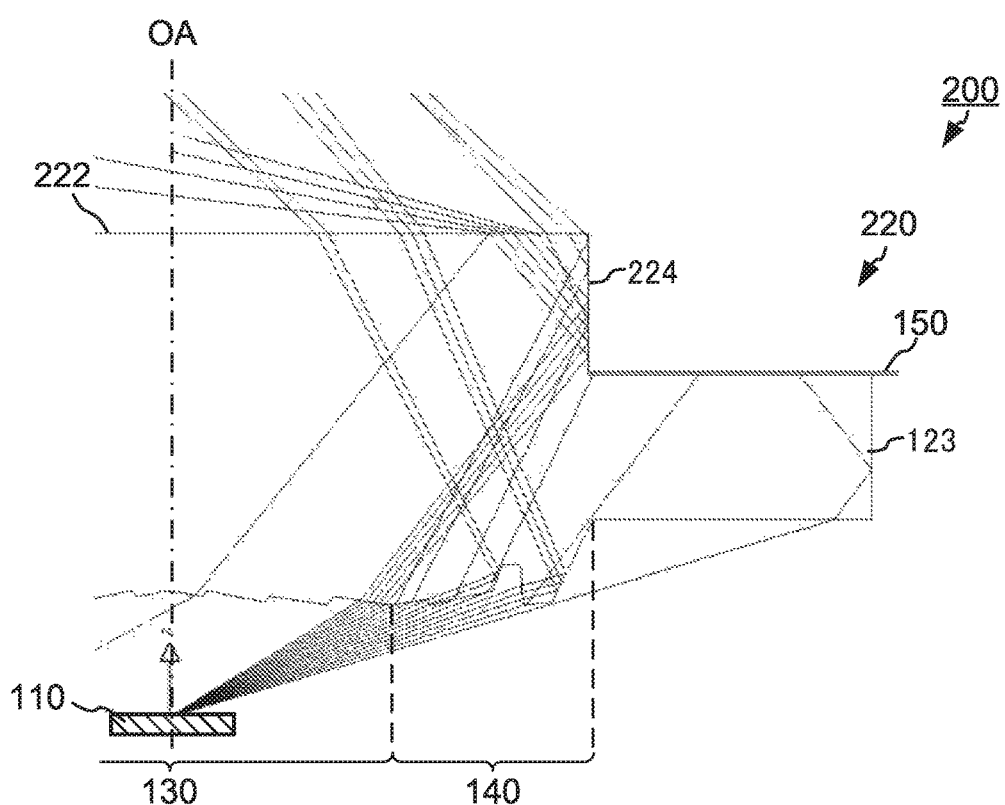

Now, the light distribution characteristics of light flux controlling member 220 according to Embodiment 2 are described. FIGS. 9A and 9B illustrate light paths in light-emitting device 200 according to Embodiment 2. FIG. 9A illustrates light paths of light having entered light flux controlling member 220 through refraction part 130, and FIG. 9B illustrates light paths of the light having entered light flux controlling member 120 through the outer region of refraction part 130 and first reflection part 140.

As illustrated in FIG. 9A and FIG. 9B, part of light emitted from light emitting element 110 (light emitted at a relatively small angle with respect to optical axis OA) enters light flux controlling member 220 through refraction part 130. At this time, the incident light is refracted such that the incident light travels away from optical axis OA of light emitting element 110 as the light propagates in light flux controlling member 220, and, the incident light is emitted from emission region 222 such that the light travels away from optical axis OA of light emitting element 110 as the light travels away from emission region 222. On the other hand, as illustrated in FIG. 9B, the light refracted at the outer region of refraction part 130 such that the light travels away from optical axis OA of light emitting element 110 as the light propagates in light flux controlling member 220 is reflected by second reflection part 224 in a direction approaching optical axis OA of light emitting element 110, and emitted from emission region 222 such that the light approaches optical axis OA of light emitting element 110 as the light travels away from emission region 222.

In addition, as illustrated in FIG. 9B, another part of the light emitted from light emitting element 110 (light emitted at a relatively large angle with respect to optical axis OA) enters light flux controlling member 220 through first incidence surface 142 and connection surface 144 of reflection part 140. The light having entered light flux controlling member 220 through incidence surface 142 is reflected by reflecting surface 143 in a direction approaching optical axis OA of light emitting element 110, and emitted from emission region 222 such that the light approaches optical axis OA of light emitting element 110 as the light travels away from emission region 222. On the other hand, the light having entered light flux controlling member 220 through connection surface 144 is reflected by second reflection part 224 in a direction approaching optical axis OA of light emitting element 110, and emitted from emission region 222 such that the light approaches optical axis OA of light emitting element 110 as the light travels away from emission region 222.

(Light Distribution Characteristics of Second Reflection Part)

Figure 10A:
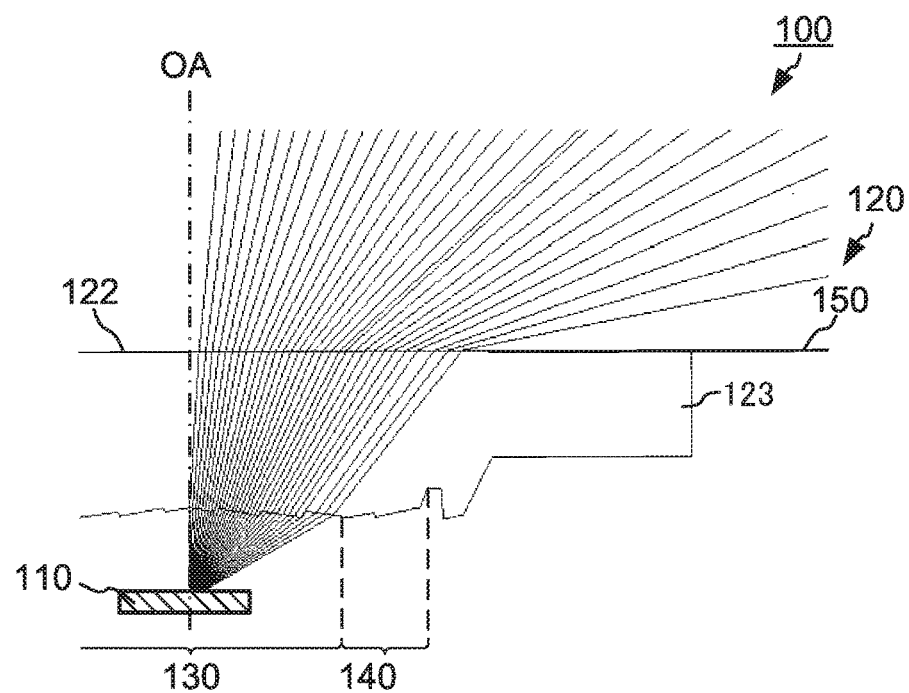
FIGS. 10A and 10B illustrate light paths in the light-emitting devices according to Embodiments 1 and 2.
Figure 10B:
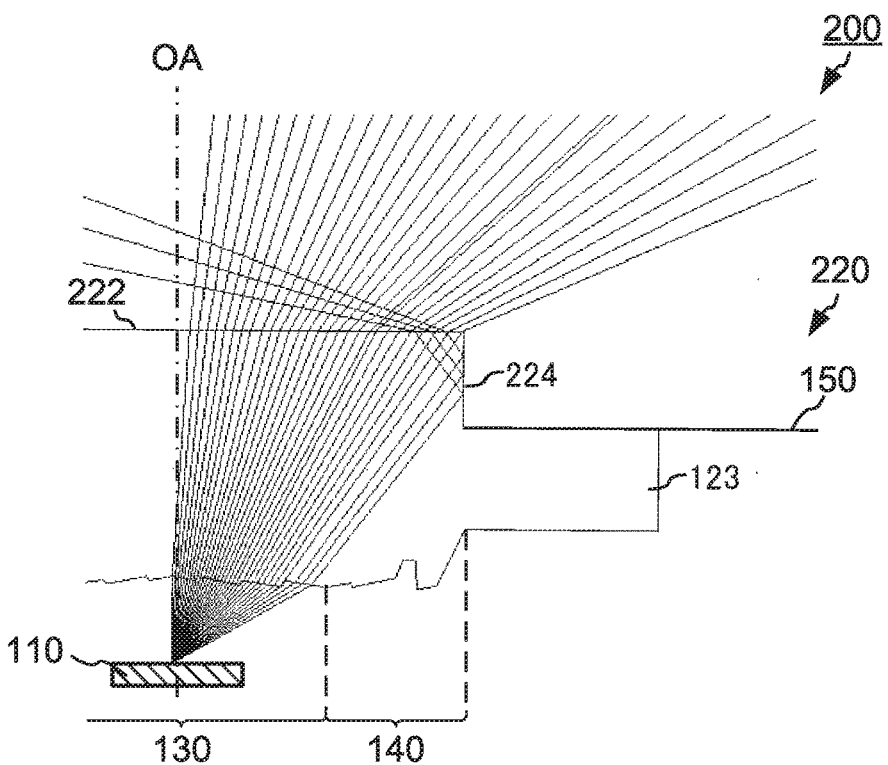
Figure 11A:
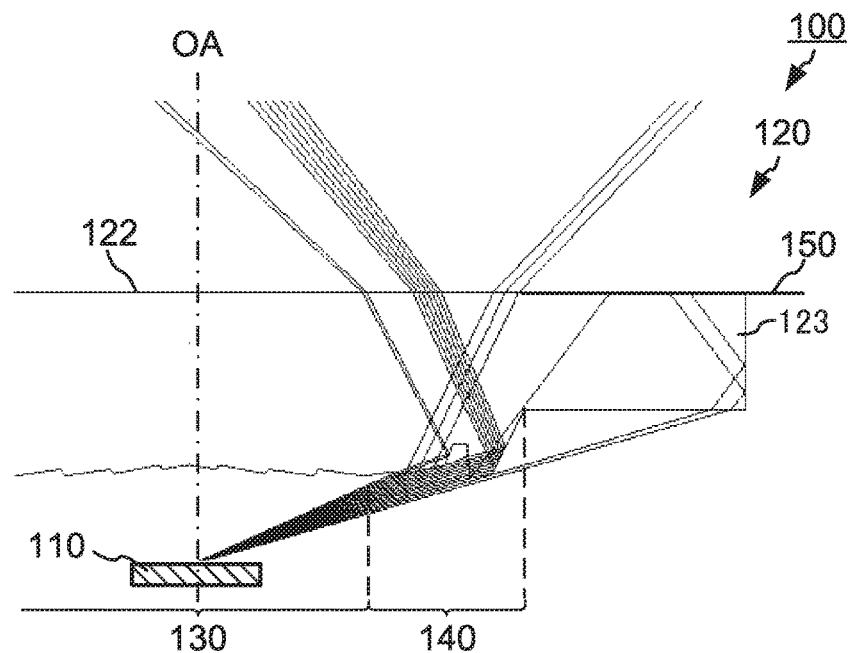
FIGS. 11A and 11B illustrate light paths in light-emitting devices according to Embodiments 1 and 2.
Figure 11B:
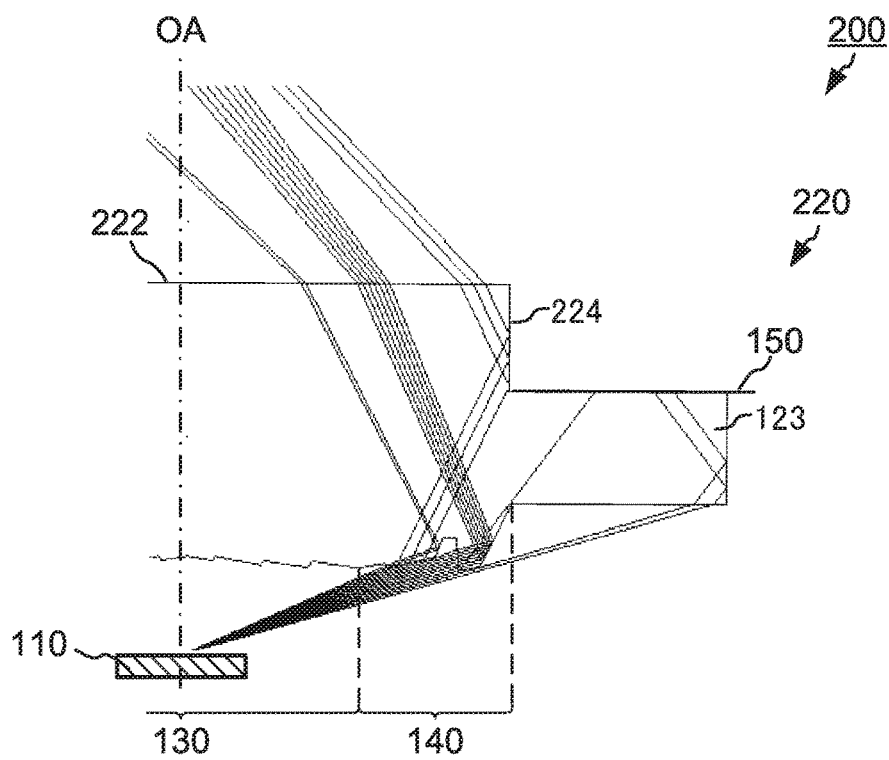

Here, the light distribution control of second reflection part 224 is specifically described. For comparison, the description will be made in comparison with the light distribution characteristics of light flux controlling member 120 according to Embodiment 1, which is not provided with second reflection part 224. FIG. 10A and FIG. 11A illustrate light paths in light-emitting device 100 according to Embodiment 1, and FIG. 10B and FIG. 11B illustrate light paths in light-emitting device 200 according to Embodiment 2. FIG. 10A and FIG. 10B illustrate light paths of light incident on refraction part 130. FIG. 11A and FIG. 11B illustrate light paths of light incident on (first) reflection part 140.

As illustrated in FIG. 10A, in light flux controlling member 120 according to Embodiment 1, part of light emitted from light emitting element 110 (light emitted at a relatively small angle with respect to optical axis OA) enters light flux controlling member 120 through refraction part 130, and is refracted in a direction away from optical axis OA of light emitting element 110. Next, all of the light having reached is emitted from emission region 122 in a direction away from optical axis OA of light emitting element 110.

As illustrated in FIG. 10B, also in light flux controlling member 220 according to Embodiment 2, part of light emitted from light emitting element 110 (light emitted at a relatively small angle with respect to optical axis OA) enters light flux controlling member 220 through refraction part 130, and is refracted such that the light travels away from optical axis OA of light emitting element 110 as the light propagates in light flux controlling member 220. Next, most of the light having entered light flux controlling member 220 through refraction part 130 is emitted from emission region 222 without change such that the light travels away from optical axis OA of light emitting element 110 as the light travels away from emission region 222. However, in light-emitting device 200 according to Embodiment 2, the light having entered light flux controlling member 220 through the outer region of refraction part 130 reaches second reflection part 224 before reaching emission region 222. The light having reached second reflection part 224 is reflected in a direction approaching optical axis OA of light emitting element 110. Thus, the light having entered light flux controlling member 220 through the outer region of refraction part 130 is finally emitted from emission region 222 such that the light approaches optical axis OA of light emitting element 110 as the light travels away from emission region 222.

In addition, as illustrated in FIG. 11A, in light flux controlling member 120 according to Embodiment 1, another part of the light emitted from light emitting element 110 (light emitted at a relatively large angle with respect to optical axis OA) enters light flux controlling member 120 through incidence surface 142 or connection surface 144 of (first) reflection part 140. In the light incident on (first) reflection part 140, part of the light incident on connection surface 144 is refracted such that the light travels away from optical axis OA of light emitting element 110 as the light propagates in light flux controlling member 120, and emitted from emission region 122 such that the light travels away from optical axis OA of light emitting element 110 as the light travels away from emission region 122.

As illustrated in FIG. 11B, also in light flux controlling member 220 according to Embodiment 2, part of light emitted from light emitting element 110 (light emitted at a relatively large angle with respect to optical axis OA) enters light flux controlling member 220 through first incidence surface 142 or connection surface 144 of reflection part 140. In the light incident on first reflection part 140, part of light incident on connection surface 144 is refracted such that the light travels away from optical axis OA of light emitting element 110 as the light propagates in light flux controlling member 220. However, in light-emitting device 200 according to Embodiment 2, part of the light incident on connection surface 144 reaches second reflection part 224 before reaching emission region 222. The light having reached second reflection part 224 is reflected in a direction approaching optical axis OA of light emitting element 110. Thus, the part of the light incident on connection surface 144 is finally emitted from emission region 222 such that the light approaches optical axis OA of light emitting element 110 as the light travels away from emission region 222.
(Simulation)

As with Embodiment 1, simulation of the luminous intensity distribution was carried out in light-emitting device 200 having light flux controlling member 220 according to Embodiment 2. At the same time, for comparison, simulations were carried out in a light-emitting device whose first reflection part 140 in incidence region 121 is shadowed and a light-emitting device whose refraction part 130 is shadowed. Further, for comparison, as with Embodiment 1, simulations of the luminous intensity distribution were carried out in a light-emitting device having only light emitting element 110 (the light-emitting device according to comparative example 1) and a light-emitting device having only light emitting element 110 and light shielding plate 150 (the light-emitting device according to comparative example 2). In addition, in the present embodiment, simulations of the illuminance distribution were carried out in the light-emitting device according to Embodiment 2, the light-emitting device according to comparative example 1 and the light-emitting device according to comparative example 2.

Figure 12A:
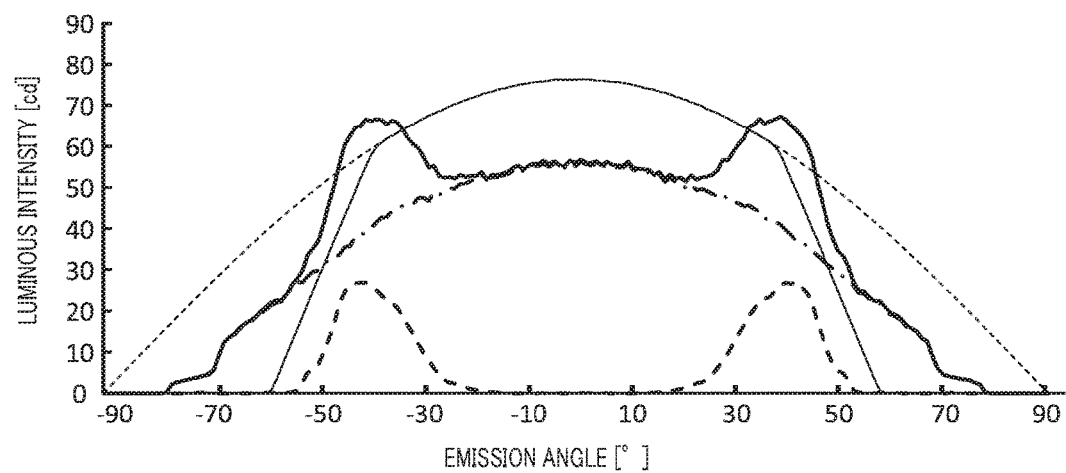
FIGS. 12A and 12B show results of simulation of the luminous intensity distribution in a light-emitting device according to Embodiment 2 and the light-emitting devices for comparison.
Figure 12B:
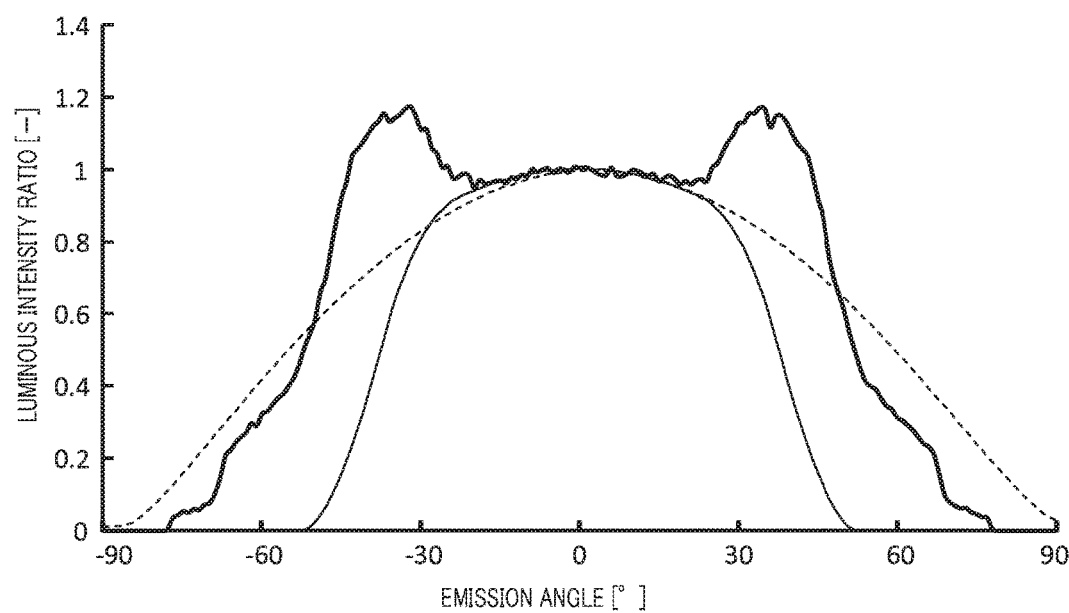

FIGS. 12A and 12B show results of simulations of the luminous intensity distribution in light-emitting device 200 according to the present embodiment and the light-emitting device for comparison. In FIG. 12A, the abscissa indicates emission angle) (°) of the light emitted from emission region 122 of the light-emitting device with respect to optical axis OA of light emitting element 110 (0 degree), and the ordinate indicates the luminous intensity (cd) of the light emitted from the light-emitting device. In FIG. 12B, the ordinate indicates the luminous intensity ratio (relative luminous intensity) in the case where the luminous intensity of the light having an emission angle of 0 degree is set as a reference (1).

Figure 13:
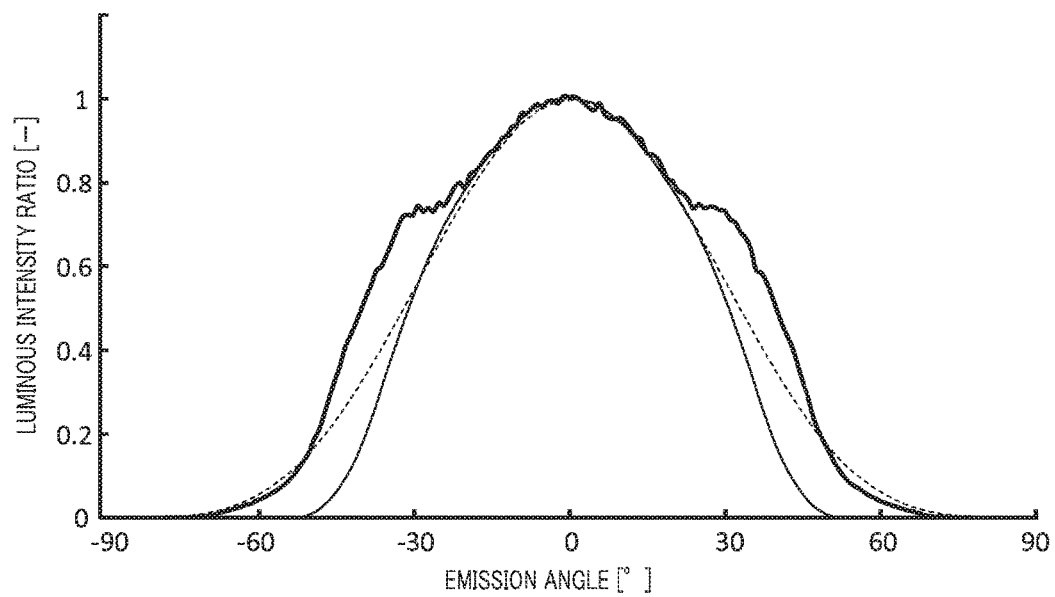
FIG. 13 shows results of simulation of the illuminance distribution in the light-emitting device according to Embodiment 2 and the light-emitting devices for comparison.

FIG. 13 shows results of simulations of the illuminance distribution in light-emitting device 200 according to the present embodiment, the light-emitting device according to comparative example 1 and the light-emitting device according to comparative example 2. FIG. 13 shows results of simulations of the illuminance distribution on an illumination surface, which is a planar illumination surface placed at a distance of 1 m from the light emitting surface of light emitting element 110. In FIG. 13, the abscissa indicates emission angle (°) of the light emitted from emission region 122 of the light-emitting device with respect to optical axis OA of light emitting element 110 (0 degree). In addition, the ordinate indicates the relative illuminance (illuminance ratio) at a point where light emitted at each emission angle reaches the illumination surface. Here, the illuminance ratio (relative illuminance) was calculated by setting reference (1) to the illuminance of the point where light having an emission angle of 0 degree (the light impinges on a center portion of the illumination surface) reaches.

In addition, in FIGS. 12A to FIG. 13, the result of the simulation in light-emitting device 200 according to the present embodiment is indicated with thick solid line, the result of the simulation in a light-emitting device having only light emitting element 110 (the light-emitting device according to comparative example 1) is indicated with thin broken line, and the result of the simulation in a light-emitting device having only light emitting element 110 and light shielding plate 150 (the light-emitting device according to comparative example 2) is indicated with thin solid line.

In addition, in FIG. 12A, the result of the simulation in a light-emitting device whose first reflection part 140 is shadowed is indicated with dashed line, and the result of the simulation in a light-emitting device whose refraction part 130 is shadowed is indicated with thick broken line.

As mentioned in Embodiment 1, it can be said that the light-emitting device having only light emitting element 110 (the light-emitting device according to comparative example 1) cannot uniformly illuminate the illumination surface with light (see thin broken line in FIG. 12A). In addition, it can be said from comparison between the light-emitting device according to comparative example 1 and the light-emitting device according to comparative example 2 that, also in the present embodiment, light shielding plate 150 controls the light in such a manner as to shadow the light emitted from light emitting element 110 in the directions outside the range of −45 degrees to +45 degrees, and to illuminate the illumination surface in a spot-like manner with the light in the directions that fall within the range of −45 degrees to +45 degrees (see the thin solid line in FIG. 12A).

In contrast, as indicated with the dashed line in FIG. 12A, it was confirmed that the light-emitting device whose first reflection part 140 is shadowed emits light in directions of −80 degrees to +80 degrees. From this result, it was confirmed that refraction part 130 contributes to reduce generation of the bright spot by spreading the incident light to reduce the luminous intensity at the center of the illumination surface (in the direction of the emission angle of 0 degree) also in Embodiment 2. Here, from the fact that the range of the emission angle of the emission light (−80 degrees to +80 degrees) is wider than the range of the emission angle of the light of the light-emitting device according to Embodiment 1 (−65 degrees to +65 degrees), it was confirmed that second reflection part 224 contributes to further spread part of the light having entered the light flux controlling member through refraction part 130 (see FIG. 10B).

In addition, it was confirmed that the light-emitting device whose refraction part 130 is shadowed emits light in directions of −60 degrees to −30 degrees and +30 degrees to +60 degrees. Also in Embodiment 2, it was confirmed that first reflection part 140 appropriately controls the light which is shadowed by light shielding plate 150 in the light-emitting device according to comparative example 2, so as to emit the light from the window (emission region 222) of light shielding plate 150, thus contributing to increase the amount of the light that reaches the outer periphery portion of the illumination surface. In this case, second reflection part 224 contributes to increase the amount of light that reaches the outer periphery portion of the illumination surface by directing excessively spread light toward light optical axis OA of light emitting element 110 (see FIG. 11B).

As a result, as indicated with the thick solid line in FIGS. 12A and 12B, light-emitting device 200 according to the present embodiment can reduce the luminous intensity of the emission light having a small emission angle (−30 degrees to +30 degrees), and can increase the luminous intensity of the emission light having a large emission angle (−80 degrees to −30 degrees and +30 degrees to +80 degrees). Thus, in light-emitting device 200 according to Embodiment 2, the light having a large emission angle has a relatively high luminous intensity in comparison with the light having a small emission angle. Accordingly, as illustrated in FIG. 13, light-emitting device 200 according to the present embodiment can more uniformly illuminate the illumination surface with light by making up the insufficient light amount at the outer periphery portion of the illumination surface in comparison with the light-emitting device according to comparative example 1 and comparative example 2. To be more specific, also in directions of approximately ±40 degrees, light-emitting device 200 according to the present embodiment can illuminate the illumination surface with light with an illuminance of 50% or greater of the emission light in the direction of optical axis OA.

(Effect)

As described above, light flux controlling member 220 and light-emitting device 200 according to the present embodiment can achieve an effect similar to that of light flux controlling member 120 and light-emitting device 100 according to Embodiment 1, and further, can uniformly output light over a wider range with use of second reflection part 224.

Figure 14A:
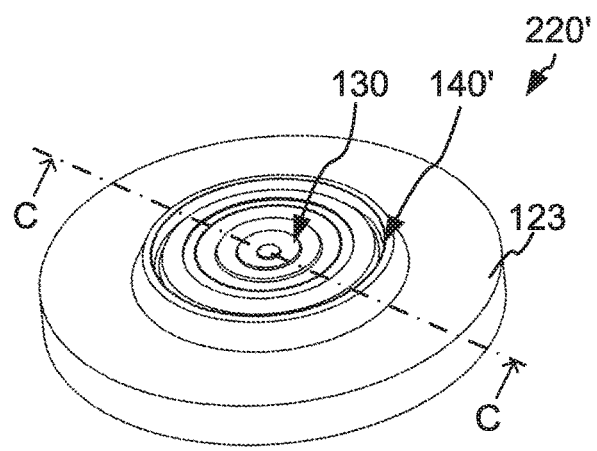
FIGS. 14A to 14C illustrate a configuration of a light flux controlling member according to a modification of Embodiment 2.
Figure 14B:
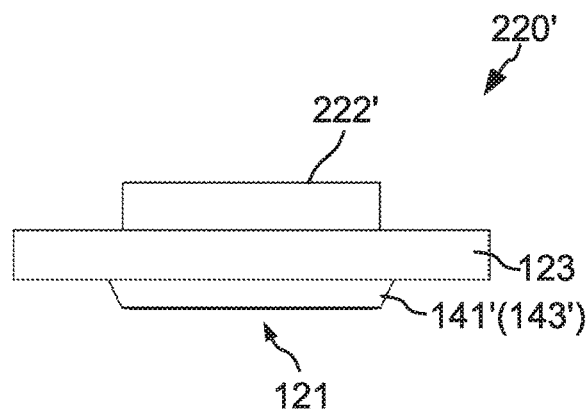
Figure 14C:
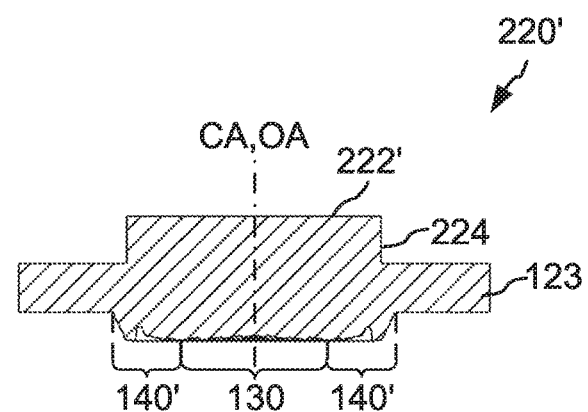

While the distance from optical axis OA to the outer edge of reflecting surface 143 of protrusion 141 located at the outermost position of first reflection part 140 is substantially equal to the distance from optical axis OA to the outer edge of emission region 222 in light flux controlling member 220 according to Embodiment 2, the position of reflecting surface 143 of the outermost protrusion 141 is not limited to this. FIGS. 14A to 14C illustrate a configuration of light flux controlling member 220' according to a modification of Embodiment 2. FIG. 14A is a perspective view, FIG. 14B is a side view, and FIG. 14C is a sectional view taken along line C-C of FIG. 14A. In light flux controlling member 220', light is reflected at reflecting surface 143' of first reflection part 140' (protrusion 141') in a direction approaching optical axis OA. Therefore, as illustrated in FIG. 14B and FIG. 14C, the inner edge of reflecting surface 143' of protrusion 141' located at the outermost part of first reflection part 140' may be disposed at a position remote from optical axis OA relative to the outer edge of emission region 222'. Also in this case, first reflection part 140' can appropriately control the distribution of light emitted at a large emission angle from light emitting element 110 before emitting the light from emission region 222'.

INDUSTRIAL APPLICABILITY

The light flux controlling member and the light-emitting device according to the embodiments of the present invention can uniformly illuminate an illumination region. The light-emitting device according to the embodiments of the present invention is useful for a flash of a camera, for example.

REFERENCE SIGNS LIST 100, 200 Light-emitting device
110 Light emitting element
120, 220, 220' Light flux controlling member
121 Incidence region
122, 222 Emission region
123 Flange
130 Refraction part
140, 140' (First) Reflection part
141, 141' Protrusion
142 Incidence surface
143, 143' Reflecting surface
144 Connection surface
150 Light shielding plate
224 Second reflection part
CA Central axis
OA Optical axis

The invention claimed is:

1. A light flux controlling member configured to control distribution of light emitted from a light emitting element, the light flux controlling member comprising:
    an incidence region on which the light emitted from the light emitting element is incident; and
    an emission region formed on a side opposite to the incidence region and configured to emit the light incident on the incidence region, the emission region having an area smaller than a projection area of the light flux controlling member,
    wherein the incidence region includes:
        a refraction part on which a part of the light emitted from the light emitting element is incident, the refraction part being disposed at a center portion of the incidence region and configured to refract the incident light such that the incident light travels away from an optical axis of the light emitting element as the incident light propagates in the light flux controlling member, and
        a first reflection part on which another part of the light emitted from the light emitting element is incident, the first reflection part being disposed outside the refraction part and configured to reflect the incident light such that the incident light approaches the optical axis as the incident light propagates in the light flux controlling member;
    wherein the first reflection part includes at least one protrusion having an annular shape and disposed to enclose the optical axis,
    wherein the at least one protrusion includes:
        an incidence surface on which the another part of the light emitted from the light emitting element is incident, and
        a reflecting surface disposed outside the incidence surface and configured to reflect light incident on the incidence surface in a direction approaching the optical axis;
    wherein the emission region emits light reflected by the first reflection part such that the light approaches the optical axis as the light travels away from the emission region;
    wherein all of the light incident on the first reflection part is emitted from the emission region;
    wherein an inner edge of an outermost position of the reflecting surface of the at least one protrusion is disposed at a position farther than an outer edge of the emission region from the optical axis;
    wherein the light flux controlling member further includes a second reflection part disposed to enclose the optical axis between the incidence region and the emission region, the second reflection part being a side surface of a protrusion disposed on the light flux controlling member on the side opposite to the incidence region, the second reflection part being configured to reflect a portion of light incident on the refraction part in the incidence region in a direction in which the light approaches the optical axis as the light propagates in the light flux controlling member; and
    wherein the emission region emits light reflected by the second reflection part in a direction approaching the optical axis.

2. The light flux controlling member according to claim 1, wherein the refraction part has a fresnel lens shape.

3. A light-emitting device comprising:
a light emitting element; and
the light flux controlling member according to claim 1 disposed such that a central axis of the light flux controlling member coincides with the optical axis.

4. A light-emitting device comprising:
a light emitting element; and
the light flux controlling member according to claim 2 disposed such that a central axis of the light flux controlling member coincides with the optical axis.

* * * * *